(12) United States Patent
Hayasaka et al.

(10) Patent No.: US 8,463,001 B2
(45) Date of Patent: Jun. 11, 2013

(54) IMAGE PICKUP APPARATUS

(75) Inventors: Kengo Hayasaka, Tokyo (JP); Isao Ichimura, Tokyo (JP); Kenji Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 758 days.

(21) Appl. No.: 12/452,324

(22) PCT Filed: Jul. 30, 2008

(86) PCT No.: PCT/JP2008/063649
§ 371 (c)(1),
(2), (4) Date: Dec. 24, 2009

(87) PCT Pub. No.: WO2009/017149
PCT Pub. Date: Feb. 5, 2009

(65) Prior Publication Data
US 2010/0142770 A1    Jun. 10, 2010

(30) Foreign Application Priority Data

Jul. 30, 2007    (JP) .................................. 2007-197606

(51) Int. Cl.
*G06K 9/00* (2006.01)
*G02B 27/10* (2006.01)

(52) U.S. Cl.
CPC .................................. *G06K 9/00013* (2013.01)
USPC ......................................... 382/124; 359/618

(58) Field of Classification Search
CPC ............ G06K 9/00019; G06K 9/00026; G06K 9/00084; G06K 9/00065; G06K 9/00013
See application file for complete search history.

(56) References Cited

FOREIGN PATENT DOCUMENTS

| JP | 07-021373 |   | 1/1995 |
|----|-----------|---|--------|
| JP | 10-210272 | * | 8/1998 |
| JP | 2003-084259 | * | 3/2003 |
| JP | 2006-285487 |   | 10/2006 |
| JP | 2007-122411 |   | 5/2007 |

(Continued)

OTHER PUBLICATIONS

International Search Report; International Application No. PCT/JP2008/063649; Dated: Aug. 19, 2008.
Notification of Transmittal of Translation of the International Preliminary Report on Patentability of corresponding PCT Application No. PCT/JP2008/063649.

*Primary Examiner* — Kim Vu
*Assistant Examiner* — Fred Hu
(74) *Attorney, Agent, or Firm* — Rader, Fishman & Grauer PLLC

(57) ABSTRACT

An image pickup apparatus capable of improving the image quality of a picked-up image at the time of closely picking up an image is provided. In an image processing section 14, after a process of clipping a central region 31 and an image reversing process are performed in each of image pickup regions 3 of microlenses on image pickup data D1 obtained by an image pickup device 13, an image synthesizing process using images is performed to obtain image-processed data (image pickup data D2). In the image pickup data D2, the process of clipping the central region 31 is performed in each of the image pickup regions 3 of the microlenses, so even if a living organism 2 as an object subjected to image pickup is closely placed, an overlap region 32 between the image pickup regions 3 by adjacent microlenses is removed. In addition, the range of the central region 31 may have a fixed value which is set in advance, or may be changed depending on a distance between the object subjected to image pickup (living organism) 2 and a microlens array 12.

8 Claims, 12 Drawing Sheets

FOREIGN PATENT DOCUMENTS

| WO | WO-2006/007718 | 1/2006 |
| WO | WO-2006/077718 A1 | 7/2006 |
| WO | WO 2006077718 A1 * | 7/2006 |

* cited by examiner

IMAGE PICKUP APPARATUS

TECHNICAL FIELD

1. Field of the Invention

The present invention relates to an image pickup apparatus using a microlens array.

2. Background Art

Various image pickup apparatuses have been proposed and developed in the past. Moreover, an image pickup apparatus performing predetermined image processing on image pickup data obtained by picking up an image to output the image pickup data has been proposed.

Further, as an application using image data obtained by performing predetermined image processing on image pickup data, a biometrics authentication system for fingerprint authentication, vein authentication or the like has been proposed (for example, refer to Patent Documents 1 to 3).

Patent Document 1: Japanese Unexamined Patent Application Publication No. H7-21373

Patent Document 2: Japanese Unexamined Patent Application Publication No. 2006-285487

Patent Document 3: Japanese Unexamined Patent Application Publication No. 2007-122411

DISCLOSURE OF THE INVENTION

In an image pickup apparatus used in such a biometrics authentication system or the like, as an image pickup optical system, a microlens array in which a plurality of microlenses are arranged in an array and an image pickup device such as a CCD (Charge Coupled Device) may be used. It is because in the image pickup optical system with such a configuration, compared to an image pickup optical system including one optical lens and an image pickup device, a reduction in the profile of the image pickup optical system becomes possible, thereby a reduction in the whole profile of the apparatus is achieved.

However, when an image of a living organism as an object subjected to image pickup is closely picked up, image pickup regions of adjacent microlenses overlap each other because of the viewing angle characteristics of microlenses, so an image in an overlapped region (an overlap region) becomes a noise. Therefore, as such a noise is included, a decline in the image quality of a picked-up image occurs. In particular, when biometrics authentication using a picked-up image which includes such a noise is performed, authentication precision declines, thereby an error may occur in authentication.

In view of the foregoing, it is an object of the invention to provide an image pickup apparatus capable of improving the image quality of a picked-up image at the time of closely picking up an image.

An image pickup apparatus of the invention includes: a microlens array section including a plurality of microlenses; an image pickup device obtaining image pickup data of an object subjected to image pickup on the basis of light condensed by the microlens array section; and an image processing section performing image processing on the image pickup data obtained by the image pickup device to obtain image-processed data. In this case, after the image processing section performs a central region clipping process and an image reversing process in each of image pickup regions of the microlenses on the image pickup data, the image processing section performs an image synthesizing process using images in central regions of the image pickup regions to obtain the image-processed data.

In the image pickup apparatus of the invention, the image processing section performs a central region clipping process and an image reversing process in each of image pickup regions of the microlenses on the image pickup data obtained by the image pickup device, and then performs an image synthesizing process using images in central regions of the image pickup regions, thereby image-processed data is obtained. In this case, in the image-processed data, the central region clipping process in each of the image pickup regions of the microlenses is performed, so even in the case where an object subjected to image pickup is closely placed, an overlap region between the image pickup regions by adjacent microlenses is removed.

In the image pickup apparatus of the invention, in the case where the above-described object subjected to image pickup is a living organism, a light source applying light to the living organism and an authentication section performing the authentication of the living organism on the basis of the image-processed data obtained by the image processing section may be included. In such a configuration, on the basis of the image-processed data as image pickup data after the above-described overlap region is removed, the authentication of the living organism is performed. Therefore, it becomes possible to perform biometrics authentication by a picked-up image with high image quality, and authentication precision is improved.

According to the image pickup apparatus of the invention, after the image processing section performs the central region clipping process and the image reversing process in each of the image pickup regions of the microlenses on the image pickup data obtained by the image pickup device, the image synthesizing process using images in central regions of the image pickup regions is performed to obtain image-processed data, so even in the case where the object subjected to image pickup is closely placed, the overlap region between the image pickup regions by adjacent microlenses is able to be removed. Therefore, the image quality of a picked-up image at the time of closely picking up an image is able to be improved.

BEST MODE(S) FOR CARRYING OUT THE INVENTION

A preferred embodiment will be described in detail below referring to the accompanying drawings.

Figure 1:
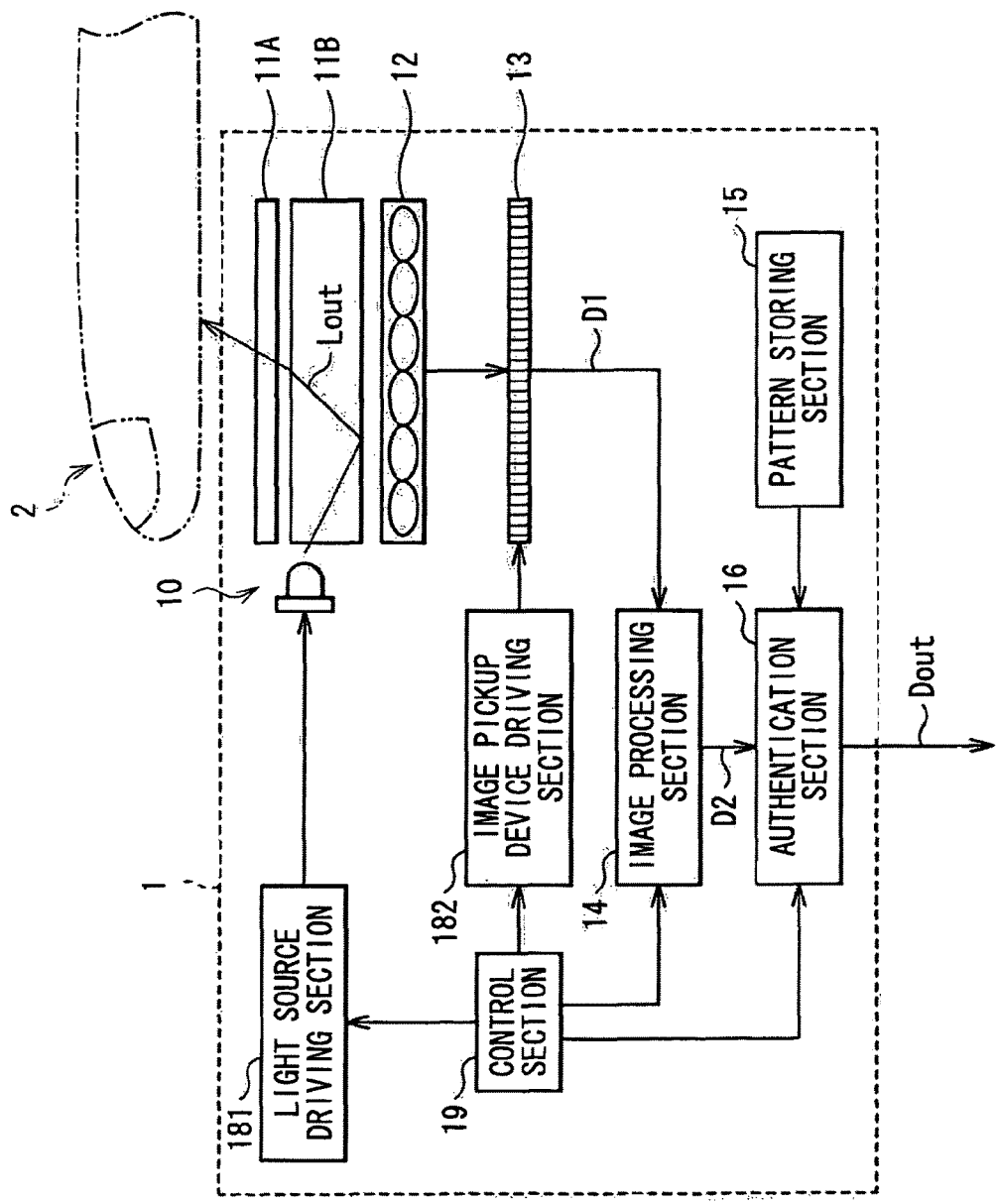
FIG. 1 is a functional block diagram illustrating the configuration of a biometrics authentication system according to an embodiment of the invention.

FIG. 1 illustrates a sectional view of a biometrics authentication system (biometrics authentication system 1) according to an embodiment of the invention. The biometrics authentication system 1 picks up an image of a living organism (for example, a living organism (fingertip) 2 illustrated in FIG. 2) to perform biometrics authentication (for example, in the case illustrated in FIG. 2, the biometrics authentication system 1 picks up an image of veins 20 in the living organism 2 to perform vein authentication), and then outputs an authentication result (authentication result data Dout which will be described later), and the biometrics authentications system 1 includes a light source 10, a cover glass 11A, a light guiding section 11B, a microlens array 12, an image pickup device 13, an image processing section 14, a pattern storing section 15, an authentication section 16, a light source driving section 181, an image pickup device driving section 182 and a control section 19.

The light source 10 applies light to the living organism 2 as an object subjected to image pickup, and includes, for example, an LED (Light Emitting Diode) or the like. The light source 10 preferably emits light of a near-infrared wavelength region (a wavelength region approximately from 700 nm to 1200 nm). It is because in the case where light of such a wavelength region is used, by a balance between the transmittance through a living organism and the absorption by reduced hemoglobin (veins) in the living organism 2, light use efficiency at the time of the vein authentication of the living organism 2 is able to be further improved.

As illustrated in FIG. 1, the light guiding section 11B is a section guiding light Lout emitted from the light source 10 to a direction toward the living organism 2, and is made of, for example, a glass substrate, an optical fiber or the like. The cover glass 11A is arranged on the light guiding section 11B, and is a section protecting the interior of the biometrics authentication system 1. In addition, the cover glass 11A is a section where the living organism 2 is placed at the time of authentication.

The microlens array 12 includes a plurality of microlenses arranged in a matrix form, and is arranged below the light guiding section 11B (more specifically, between the light guiding section 11B and the image pickup device 13). The microlenses in the microlens array 12 function as image pickup lenses for the living organism 2 as an object subjected to image pickup.

Figure 3:
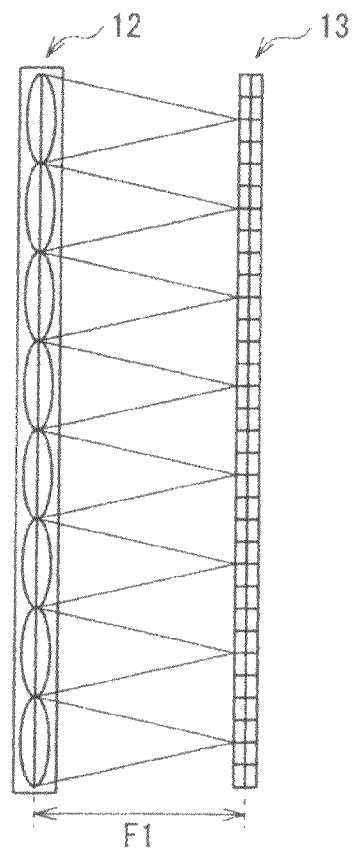
FIG. 3 is a sectional view illustrating specific configurations of a microlens array and an image pickup device illustrated in FIG. 1.

The image pickup device 13 receives light from the microlens array 12 to obtain image pickup data D1, and, for example, as illustrated in FIG. 3, the image pickup device 13 is arranged on a focal point plane (an image-side focal length: F1) of the microlens array 12. The image pickup device 13 includes a plurality of CCDs or the like arranged in a matrix form.

The image processing section 14 performs image processing which will be described later on the image pickup data D1 obtained by the image pickup device 13 to obtain image-processed data (image pickup data D2), and then outputs the image-processed data to the authentication section 16. More specifically, although detailed description will be given later, after a central region clipping process and an image reversing process are performed in image pickup regions of the microlenses on the image pickup data D1, an image synthesizing process using images in central regions is performed to obtain the image pickup data D2. In addition, the image processing section 14, and the control section 19 and the authentication section 16 which will be described later each include, for example, a microcomputer or the like.

The pattern storing section 15 is a section storing a biometrics authentication pattern (which is a comparison pattern relative to an image pickup pattern obtained at the time of authentication, and which is obtained by picking up an image of a living organism in advance), and includes a nonvolatile memory device (for example, an EEPROM (Electrically Erasable Programmable Read Only Memory) or the like). The authentication section 16 is a section performing the authentication of the living organism 2 as an object subjected to image pickup by comparing an image pickup pattern (an image pickup pattern of the image pickup data D2) outputted from the image processing section 14 to the biometrics authentication pattern stored in the pattern storing section 15 in response to the control of the control section 19.

The light source driving section 181 drives the light source 10 to emit light in response to the control of the control section 19. The image pickup device driving section 182 drives the image pickup device 13 to pick up an image (to receive light) in response to the control of the control section 19.

The control section 19 controls the operations of the image processing section 14, the authentication section 16, the light source driving section 181 and the image pickup device driving section 182. More specifically, the control section 19 appropriately controls the operations of the image processing section 14, the authentication section 16, the light source driving section 181 and the image pickup device driving section 182.

Figure 4:
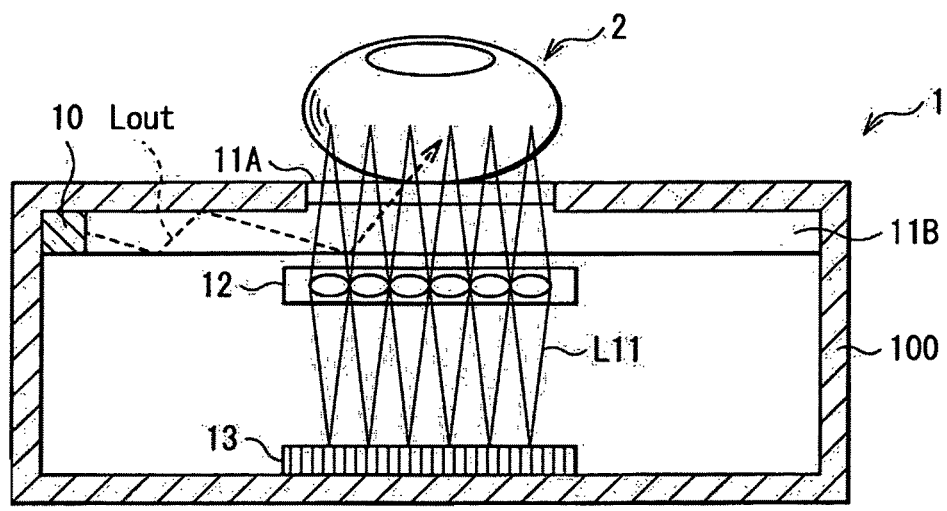
FIG. 4 is a main part sectional view for describing an optical path when a finger vein pattern is obtained.

Next, referring to FIG. 1 to FIG. 8, the operation (a biometrics authentication process) of the biometrics authentication system 1 according to the embodiment will be described in detail below. FIG. 4 illustrates a sectional view of an optical path when a finger vein pattern is obtained.

In the biometrics authentication system 1, for example, as illustrated in FIG. 4 (in this case, the living organism 2 is placed in a position at an object-side focal length F2), at first, when the living organism (for example, a fingertip) 2 is placed on the cover glass 11A, light Lout is emitted from the light source 10 by the driving operation of the light source driving section 181 to be applied to the living organism 2 via the light guiding section 11B and the cover glass 11A. When an image of the living organism 2 is picked up in this state, an incident light ray to the microlens array 12 is refracted as illustrated by a light ray L11 in the drawing to be condensed on the image pickup device 13. In other words, in this case, the focal point of the microlens array 12 is adjusted to the inside (a vein part)

of the living organism 2 and on the image pickup device 13, so the image pickup data D1 (a vein pattern) of veins of the living organism 2 is obtained. Image processing which will be described below is performed on the image pickup data D1 obtained by the image pickup device 13 in such a manner by the image processing section 14, and the processed image pickup data D1 is supplied to the authentication section 16 as image pickup data D2 (image-processed data). In the authentication section 16, the inputted image pickup data D2 (the vein pattern) is compared to an authentication pattern for vein authentication stored in the pattern storing section 15, thereby vein authentication is performed. Then, in the authentication section 16, a final biometrics authentication result (authentication result data Dout) is outputted, thereby a biometrics authentication process is completed.

Figure 5:
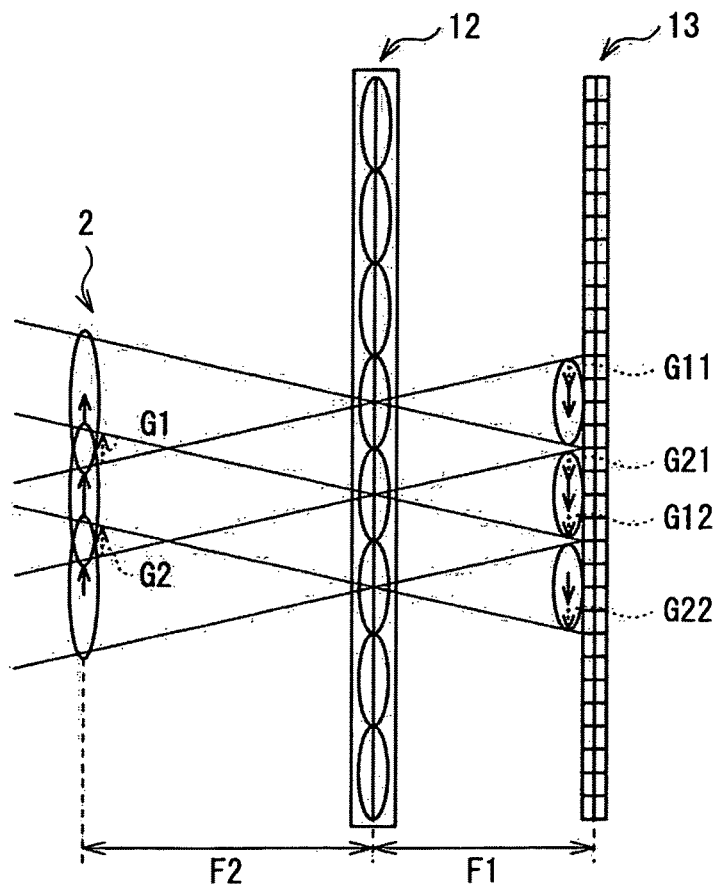
FIG. 5 is a main part sectional view for describing an overlap component at the time of image pickup.

In this case, in the case where an image of the living organism 2 as an object subjected to image pickup is closely picked up in such a manner, for example, as illustrated in FIG. 5 (in the case where the living organism 2 is placed in a position at an object-side focal length F2 of the microlens array 12), image pickup regions (image pickup regions 3 which will be described later) of adjacent microlenses overlap each other because of the viewing angle characteristics of the microlenses, so an image (overlap components G11, G12, G21 and G22 in the drawing) in an overlapped region (an overlap region 32 which will be described later) becomes a noise. The overlap components G11 and G12 in the drawing are caused by picking up an image of a part indicated by a reference numeral G1 in the living organism 2 as an object subjected to image pickup, and the overlap components G21 and G22 are caused by picking up an image of a part indicated by a reference numeral G2 in the living organism 2. In the case where the image pickup data D1 including such a noise (the overlap components G11, G12, G21 and G22) is used as it is to perform biometrics authentication, the image quality of the image pickup data declines, so authentication precision declines, and an error may occur in authentication.

Figure 6:
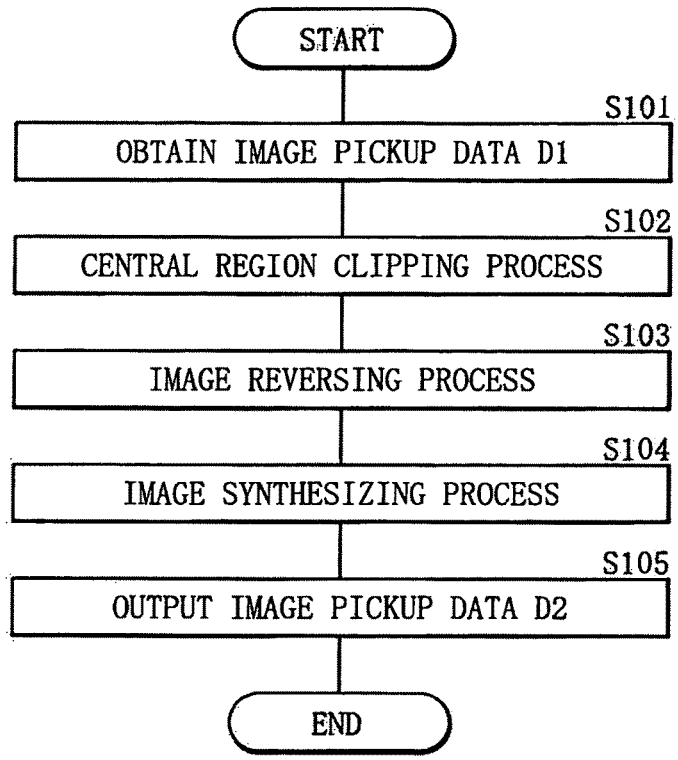
FIG. 6 is a flowchart illustrating a process operation according to the embodiment.
Figure 7:
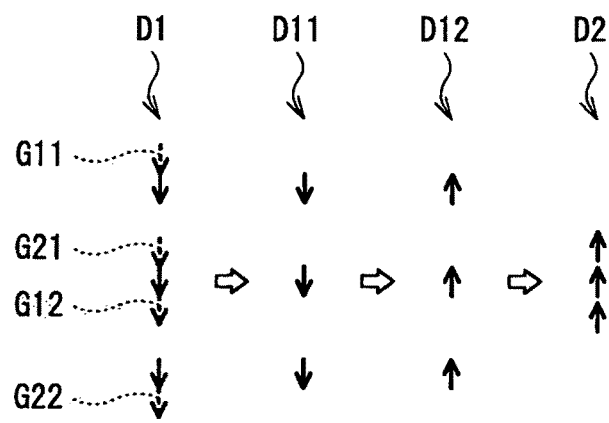
FIG. 7 is a conceptual view for describing the process operation illustrated in FIG. 6.
Figure 8:
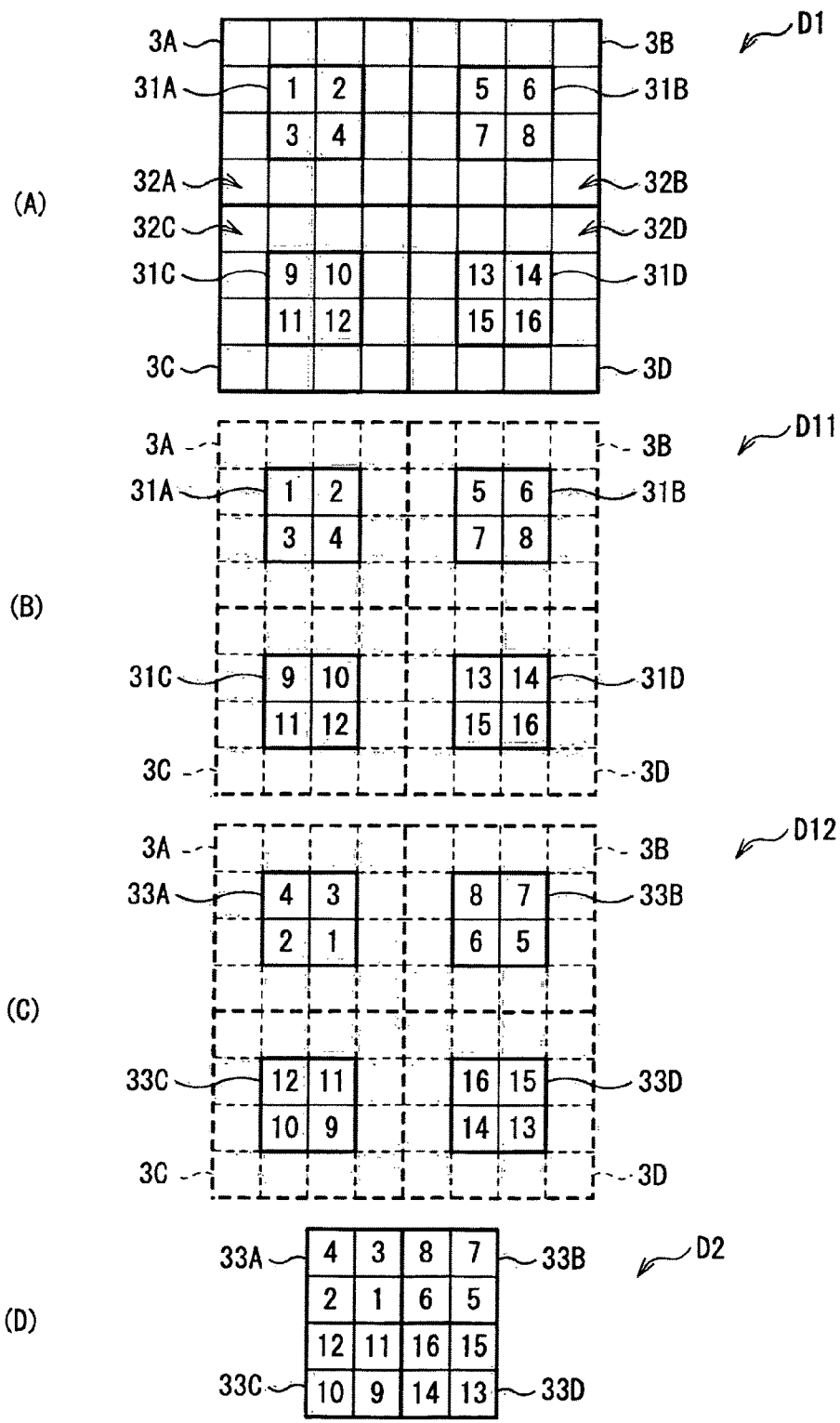
FIG. 8 is a schematic view for describing the process operation illustrated in FIG. 6.

Therefore, in the biometrics authentication system 1 according to the embodiment, the image processing section 14 performs, for example, an image processing operation illustrated in FIGS. 6, 7 and 8 on the image pickup data D1 obtained by the image pickup device 13 to reduce a decline in the image quality of the image pickup data in the case where an image of the living organism 2 is closely picked up. In this case, FIG. 6 illustrates a flowchart of an example of the image processing operation by the image processing section 14, and FIGS. 7 and 8 illustrate a conceptual view and schematic views of such an image processing operation. In FIG. 7, arrows in the image pickup data D1, D11, D12 and D2 each illustrate a range where only one microlens in the microlens array 12 resolves, and in FIG. 8, for the sake of convenience, reference numerals "1 to 16" illustrate the details of image pickup data of each pixel of the image pickup device 13 in central regions 3A to 3D which will be described later.

In the image processing section 14, for example, as illustrated in FIGS. 7 and 8(A), when the image pickup data D1 including the overlap components G11, G12, G21 and G22 in overlap regions 32A to 32D (region around the central regions 31A to 31D) of the image pickup regions 3A to 3D by the microlenses is obtained from the image pickup device 13 (step S101 in FIG. 6), at first, for example, as illustrated in FIGS. 7 and 8(B), a process of clipping the central regions 31A to 31D from the image pickup regions 3A to 3D of the microlenses to separate the overlap regions 32A to 32D from the image pickup regions 3A to 3D (step S102). Thereby, the overlap components G11, G12, G21 and G22 included in the overlap regions 32A to 32D are also separated from the image pickup data (the image pickup data D11) in the central regions 31A to 31D. For example, as illustrated in FIG. 5, in the case where the living organism 2 is placed in a position at the object-side focal length F2 of the microlens array 12, a central region 31 at the time of such a clipping process is defined by, for example, a value determined by multiplying a pitch length between microlenses by a down-magnification (for example, 0.5 times in an example illustrated in FIG. 8) by the microlens.

Next, in the image processing section 14, for example, as illustrated in FIGS. 7 and 8(C), an image reversing process is performed on the image pickup data (the image pickup data D11) in the central regions 31A to 31D in the image pickup regions 3A to 3D of the microlenses (step S103). More specifically, as illustrated in FIGS. 8(B) and (C), the order of the image pickup data is reversed vertically and horizontally in the central regions 31A to 31D (in this case, the order of a pair of image pickup data on the diagonal is reversed), thereby image pickup data D12 is obtained from the image pickup data in the central regions 33A to 33D.

Next, in the image processing section 14, for example, as illustrated in FIGS. 7 and 8(D), an image synthesizing process is performed using images in the image pickup regions 3A to 3D (image pickup data in the central regions 33A to 33D) in the image pickup data D12 to obtain image pickup data D2 (image-processed data) (step S104).

Finally, the image pickup data D2 obtained in the image processing section 14 after image processing in such a manner is outputted to the authentication section 16 (step S105), thereby the image processing operation is completed.

Thus, in the biometrics authentication system 1 according to the embodiment, the image processing section 14 performs the process of clipping the central regions 31 from the image pickup regions 3 of the microlenses and the image reversing process on the image pickup data D1 obtained by the image pickup device 13, and after that, the image synthesizing process using images in the central regions 31 is performed to obtain image-processed data (the image pickup data D2). In this case, in the image pickup data D2, the process of clipping the central regions 31 from the image pickup regions 3 of the microlenses is performed, so even in the case where the living organism 2 as an object subjected to image pickup is closely placed, the overlap region 32 between the image pickup regions 3 by adjacent microlenses is removed. Therefore, it becomes possible to improve the image quality of a picked-up image (the image pickup data D2) at the time of closely picking up an image.

Moreover, the light source 10 applying light Lout to the living organism 2 as an object subjected to image pickup and the authentication section 16 performing authentication on the basis of image-processed data (the image pickup data D2) obtained by the image processing section 14 constitute the biometrics authentication system 1, so the authentication of the living organism 2 is able to be performed on the basis of the image pickup data (the image pickup data D2) in which the overlap region 32 is removed. Therefore, biometrics authentication by a picked-up image with high image quality (the image pickup data D2) is able to be performed, and compared to related arts, it becomes possible to improve the authentication precision of the biometrics authentication.

Further, in the image processing section 14, after the clipping process (step S102) is performed on the image pickup data D1 in the image pickup regions 3 of the microlenses, the image reversing process (step S103) is performed, so as will be described later, compared to the case where the clipping process is performed after the image reversing process, a burden in the process by the image processing section 14 is able to be reduced.

As it becomes possible to improve a picked-up image at the time of closely picking up an image, the profile of an image pickup optical system (the microlens array 12 or the image pickup device 13) is able to be reduced more than before, thereby the whole profile of the biometrics authentication system 1 is able to be reduced more than before.

MODIFICATION EXAMPLE

Next, a modification example of the invention will be described below. In a biometrics authentication system of the modification example, the image processing section 14 determines whether or not the range of a central region at the time of the clipping process is appropriate, and changes the range of the central region depending on a result of determination, thereby to perform magnification correction on the object subjected to image pickup (living organism) 2. In addition, like components are denoted by like numerals as of the above-described embodiment, and will not be further described.

Figure 9:
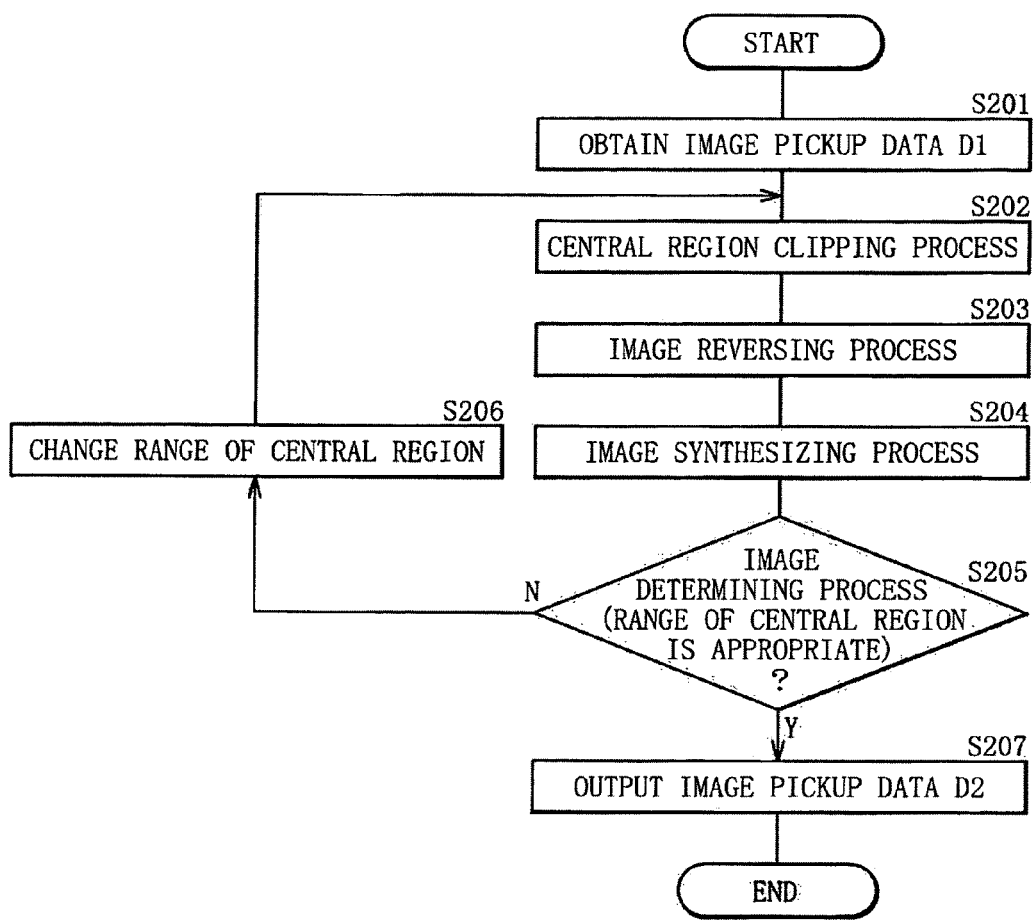
FIG. 9 is a flowchart illustrating a process operation by an image processing section according to a modification example of the invention.

FIG. 9 illustrates a flowchart of an image processing operation by the image processing section 14 according to the modification example, and corresponds to FIG. 6 in the above-described embodiment.

In the image processing operation in the modification example, first, as in the case of steps S101 to S104 in the above-described embodiment, the image pickup data D1 is obtained, and a central region clipping process, an image reversing process and an image synthesizing process are performed in this order (steps S201 to S204 in FIG. 9). However, in the modification example, the ranges of central regions 31 and 33 at the time of the central region clipping process (step S202) may not be defined in advance. In addition, as described in the above-described embodiment, the ranges of the central regions 31 and 33 may be defined by a value determined by multiplying a pitch length between the microlenses by a down-magnification by the microlenses.

Next, in the modification example, the image processing section 14 determines whether or not the ranges of the central regions 31 and 33 at the time of the clipping process (step S202) is appropriate (image determining process: step S205). More specifically, although details will be described later, in the case where an image (the image pickup data D2) obtained after the image synthesizing process (step S204) has the highest resolution, the ranges of the central regions 31 and 33 are determined appropriate. Then, in the case where the ranges of the central regions 31 and 33 are determined appropriate (step S205: Y), the image pickup data D2 is outputted as it is (step S207). On the other hand, in the case where the ranges of the central regions 31 and 33 are determined not appropriate (step S205: N), magnification correction on the object subjected to image pickup 2 is performed by performing a process of changing the ranges of the central regions 31 and 33 depending on the result of determination (step S206). Then, after that, processes of the steps S202 to S204 are repeated until the ranges of the central regions 31 and 33 are determined appropriate.

Figure 10:
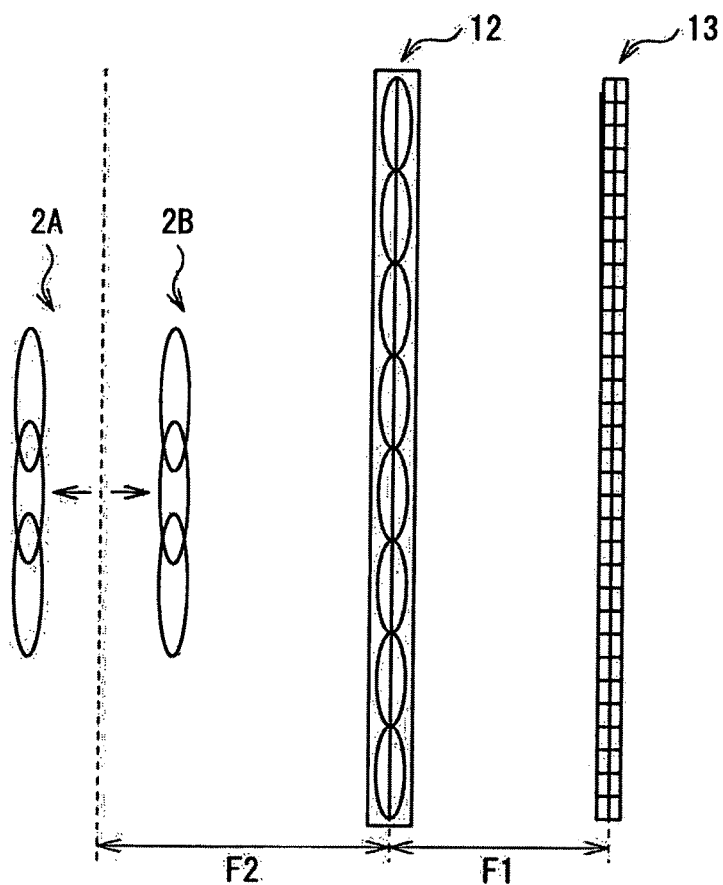
FIG. 10 is a main part sectional view for describing the process operation illustrated in FIG. 9.

The process of changing the ranges of the central regions 31 and 33 are performed in such a manner because of the following reason. That is, in the above-described embodiment, the ranges of the central regions 31 and 33 are defined in advance by a value determined by multiplying a pitch length between the microlenses by a down-magnification by the microlenses (the ranges of the central regions 31 and 33 have fixed values). Thereby, even in the case where the object subjected to image pickup 2 is closely placed, the overlap region 32 between the image pickup regions by adjacent microlenses is removed, and the image quality of a picked-up image (the image pickup data D2) at the time of closely picking up an image is improved. However, a range resolved by only one microlens is dependent on the height of an object to be picked up (the object subjected to image pickup 2), that is, the object-side focal length F2 of the microlens array 12, so unlike the above-described embodiment, when the object subjected to image pickup 2 is not placed in a position at the object-side focal length F2 of the microlens array 12 (for example, refer to objects subjected to image pickup 2A and 2B in FIG. 10), how to define the ranges of the central regions 31 and 33 may be an issue. It is because in such a case, even if the ranges of the central regions 31 and 33 are defined by a value determined by multiplying a pitch length between the microlenses by a down-magnification by the microlenses, the influence of the overlap region 32 between the image pickup regions by adjacent microlenses may not completely removed.

Figure 11:
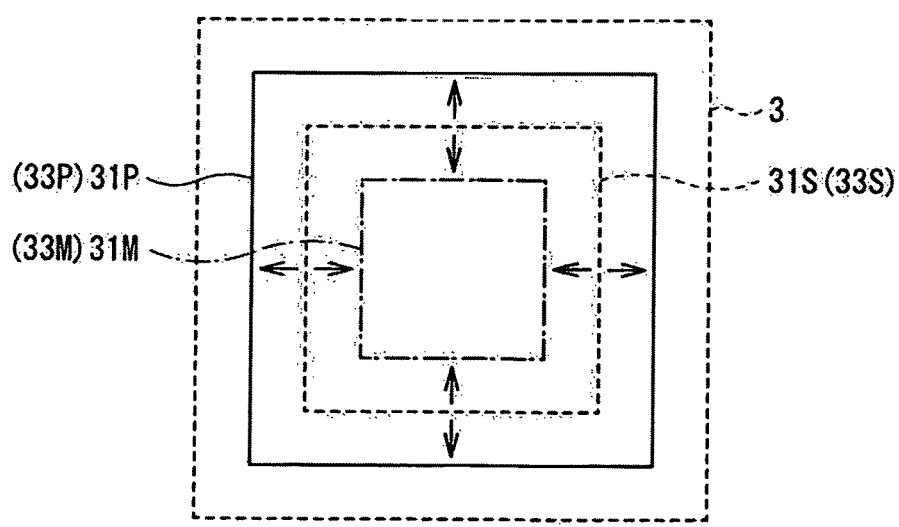
FIG. 11 is a schematic view for describing the process operation illustrated in FIG. 9.

Therefore, in the modification example, whether or not the ranges of the central regions 31 and 33 are appropriate is determined (step S205), and depending on the result of determination, for example, as illustrated in FIG. 11, the process of changing the ranges of the central regions 31 and 33 is performed, and magnification correction on the object subjected to image pickup 2 is performed. Specifically, the image processing section 14 changes the ranges of the central regions 31 and 33 depending on a distance between the object subjected to image pickup 2 and the microlens array 12. More specifically, in the case where the object subjected to image pickup 2 is placed in a position farther than the object-side focal position F2 of the microlens array 12 (for example, the object subjected to image pickup 2A in FIG. 10), the ranges of the central regions 31 and 33 are changed to be larger (the ranges of central regions 31P and 33P in FIG. 11) than a defined range (the ranges of central regions 31S and 33S in FIG. 11) defined by a value determined by multiplying a pitch length between the microlenses by a down-magnification by the microlenses. On the other hand, in the case where the object subjected to image pickup 2 is placed in a position closer than the object-side focal position F2 (for example, an object subjected to image pickup 2B in FIG. 10), the ranges of the central regions 31 and 33 are changed to be smaller (the ranges of central regions 31M and 33M in FIG. 11) than the defined range defined by a value determined by multiplying a pitch length between the microlenses by a down-magnification by the microlenses. Thereby, even if the object subjected to image pickup 2 is not placed in a position at the object-side focal length F2 of the microlens array 12, the ranges of the central regions 31 and 33 at the time of the clipping process are appropriately set.

Figure 12:
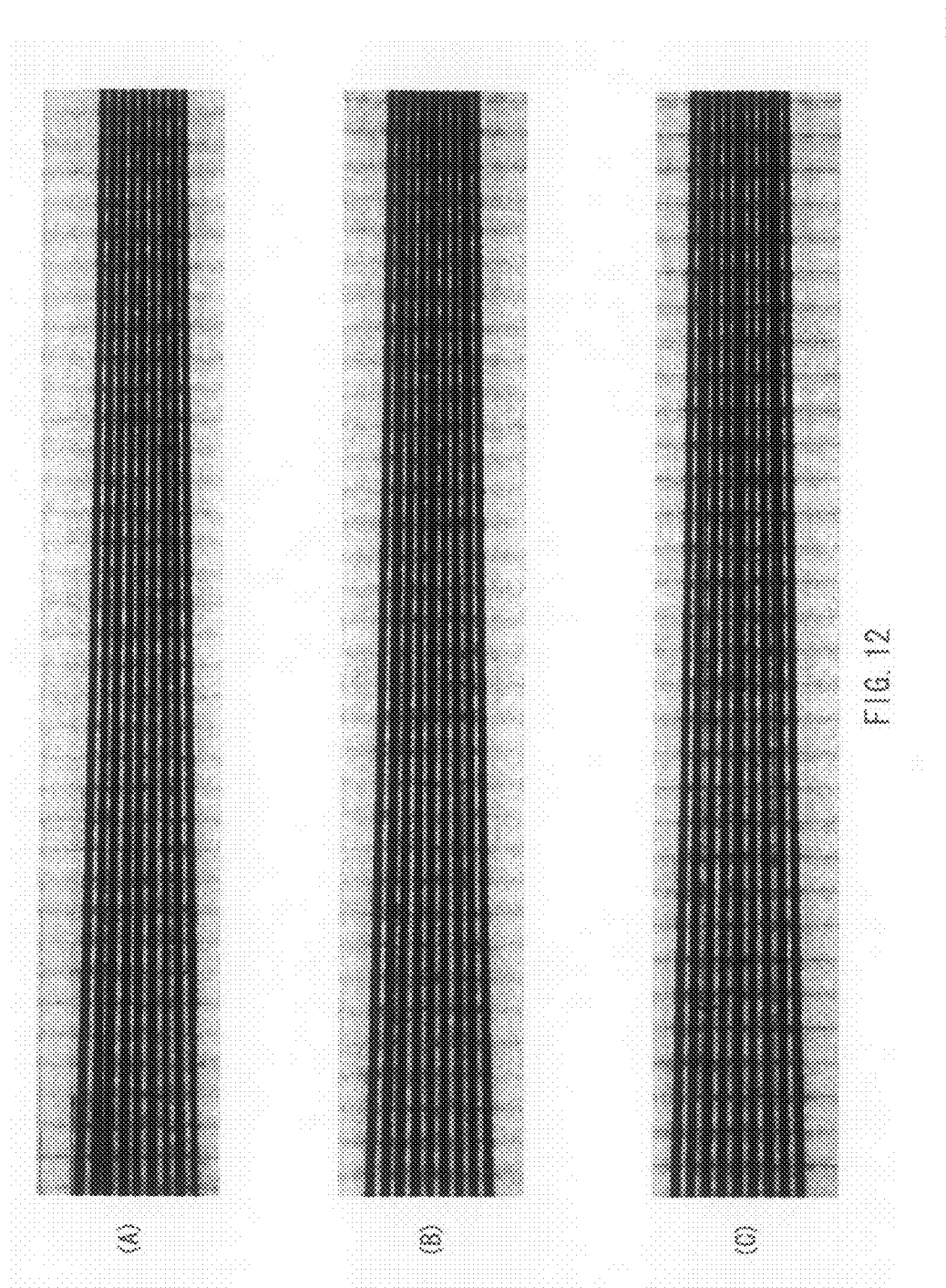
FIG. 12 is an illustration of an example of a picked-up image in the case where the range of a central region is changed.
Figure 13:
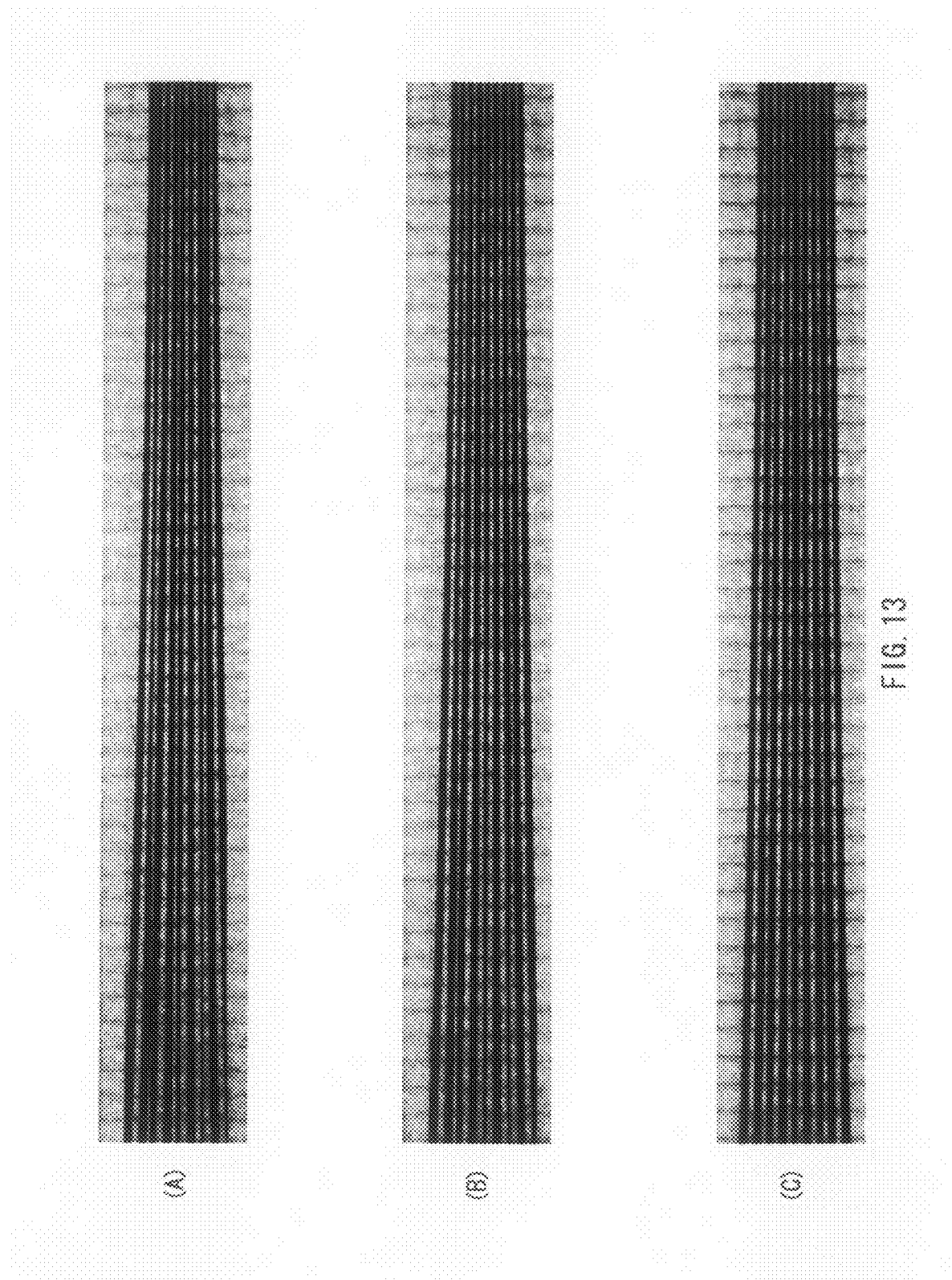
FIG. 13 is an illustration of another example of a picked-up image in the case where the range of a central region is changed.

Now, FIG. 12 illustrates an example of the image pickup data D2 in the case where a part of a chart as the object subjected to image pickup 2 is placed in a position at the object-side focal length F2 of the microlens array 12. Moreover, FIG. 13 illustrates an example of the image pickup data D2 in the case where a part of the chart as the object subjected to image pickup 2 is placed in a position at a slightly longer distance than the object-side focal length F2 of the microlens array 12 (for example, the object subjected to image pickup 2A in FIG. 10). In addition, in FIGS. 12 and 13, (B) illustrates the image pickup data D2 in the case where the central regions 31 and 33 are within defined ranges (corresponding to the ranges of the central regions 31S and 33S in FIG. 11) defined by a value determined by multiplying a pitch length between the microlenses by a down-magnification by the microlenses.

Moreover, (A) illustrates the image pickup data D2 in the case where the central regions 31 and 33 are within ranges (corresponding to ranges of the central regions 31M and 33M in FIG. 11) narrower by one pixel in top, bottom, right and left directions than the defined ranges. Further, (C) illustrates the image pickup data D2 in the case where the central regions 31 and 33 are within ranges (corresponding to the ranges of the central regions 31P and 33P in FIG. 11) larger by one pixel in top, bottom, right and left directions than the defined ranges. In this case, as described in the above-described embodiment, among three kinds of image pickup data D2 illustrated in FIGS. 12(A) to 12(C), in the case where the central regions 31 and 33 are within the defined ranges defined by a value determined by multiplying a pitch length between the microlenses by a down-magnification by the microlenses (FIG. 12(B)), the resolution is the highest. On the other hand, as described in the modification example, among three kinds of image pickup data D2 illustrated in FIGS. 13(A) to 13(C), in the case where the central regions 31 and 33 are in ranges larger by one pixel in top, bottom, right and left directions than the above-described defined ranges (FIG. 13(C)), the resolution is the highest. It is obvious from these results that when the ranges of the central regions 31 and 33 are changed depending on the distance between the object subjected to image pickup 2 and the microlens array 12, irrespective of the distance between the object subjected to image pickup 2 and the microlens array 12, the overlap region 32 between the image pickup regions by adjacent microlenses is removed, and the image quality of a picked-up image (the image pickup data D2) at the time of closely picking up an image is improved.

As described above, in the modification example, in the image processing section 14, whether or not the ranges of the central regions 31 and 33 are appropriate is determined, and the process of changing the ranges of the central regions 31 and 33 is performed depending on the result of determination, and magnification correction on the object subjected to image pickup 2 is performed, so even if the object subjected to image pickup 2 is not placed in a position at the object-side focal length F2 of the microlens array 12, the image quality of a picked-up image (the image pickup data D2) at the time of closely picking up an image is able to be improved.

Moreover, when the magnification correction is performed, distance sensing may be performed.

In addition, in the modification example, the case where one image is selected in the image determining process in order to obtain an image in which the ranges of the central regions 31 and 33 are appropriately adjusted is described; however, how to determine whether or not the ranges of the central regions 31 and 33 are appropriate or the number of images to be outputted is not limited to such a case. For example, in the case where the object subjected to image pickup 2 is a two-dimensional code, an appropriated read image corresponds to an image in which the ranges of the central regions 31 and 33 are appropriately adjusted, so the image determining process described in the modification example is not necessary.

Moreover, in the modification example, the case where the object subjected to image pickup 2 is a chart with a two-dimensional shape is described; however, in the case where the object subjected to image pickup 2 has a three-dimensional shape, a distance from a microlens is different depending on a position in an obtained image (the image pickup data D1). In such a case, the ranges of the central regions 31 and 33 are set depending on a distance between the object subjected in image pickup 2 and the microlens 12 in each of image pickup regions of the microlenses, and magnification correction in the modification example may be performed in each of the ranges of the central regions 31 and 33.

Although the present invention is described referring to the embodiment and the modification example, the invention is not limited to the embodiment and the like, and may be variously modified.

For example, in the above-described embodiment and the like, the case where after the image processing section 14 performs the clipping process (step S102), the image processing section 14 performs the image reversing process (step S103) is described; however, the clipping process may be performed after the image reversing process.

Figure 2:
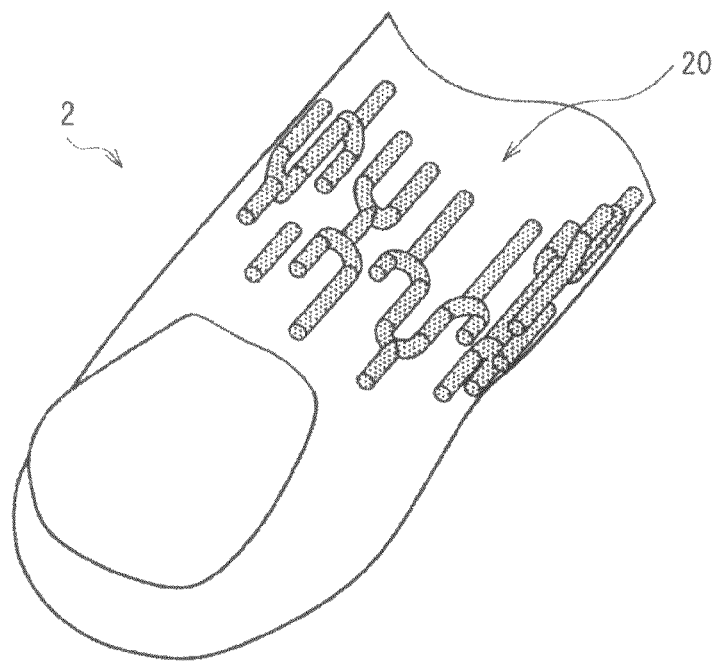
FIG. 2 is a schematic perspective view illustrating a living organism (fingertip) and the form of veins in the living organism.
Figure 14:
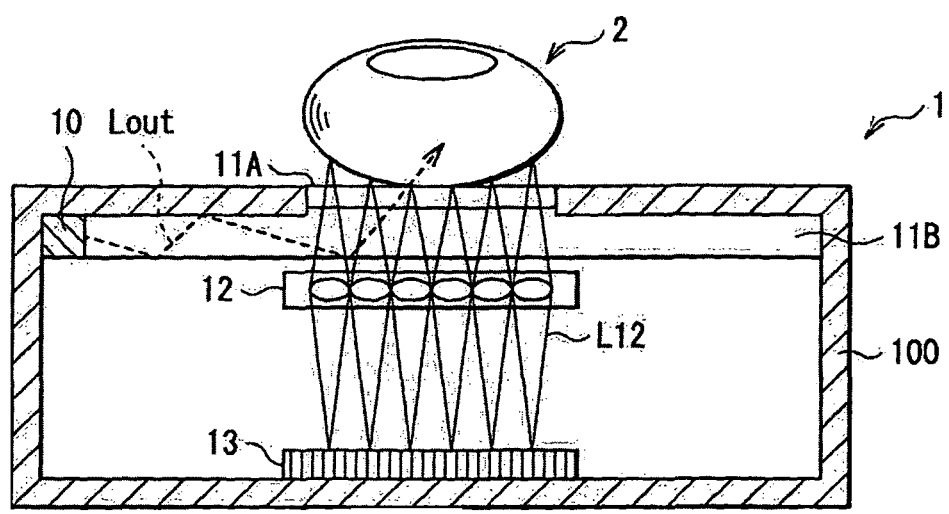
FIG. 14 is a main part sectional view for describing an optical path when a fingerprint pattern is obtained.

Moreover, in the above-described embodiment and the like, as illustrated in FIG. 2 or 4, the biometrics authentication system 1 which picks up an image of veins of the living organism 2 to perform vein authentication is described; however, for example, as illustrated in FIG. 14, an image of a fingerprint of the living organism 2 is picked up by a light ray L12 to perform fingerprint authentication.

Figure 15:
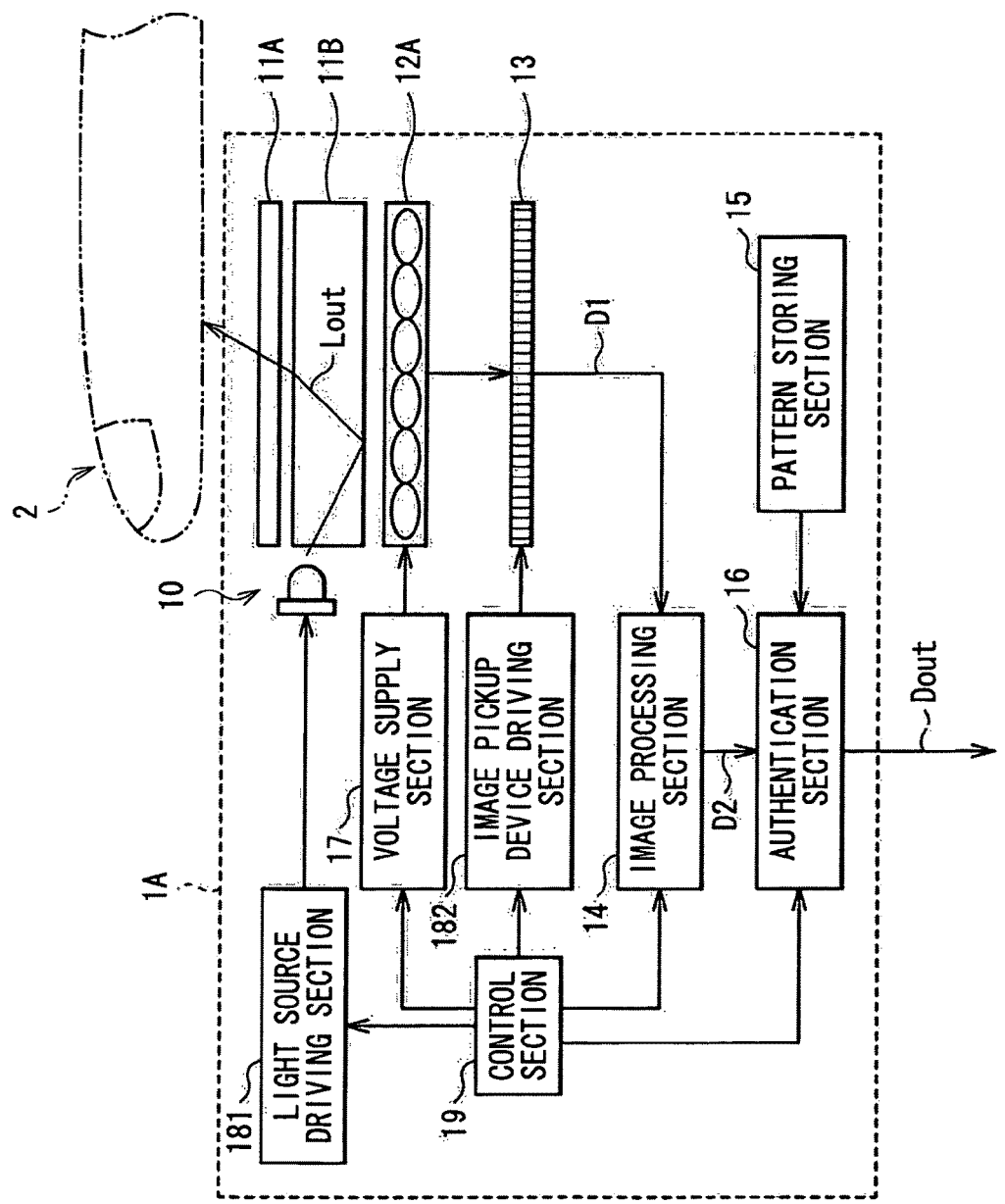
FIG. 15 is a functional block diagram illustrating the configuration of a biometrics authentications system according to another modification example of the invention.
Figure 16:
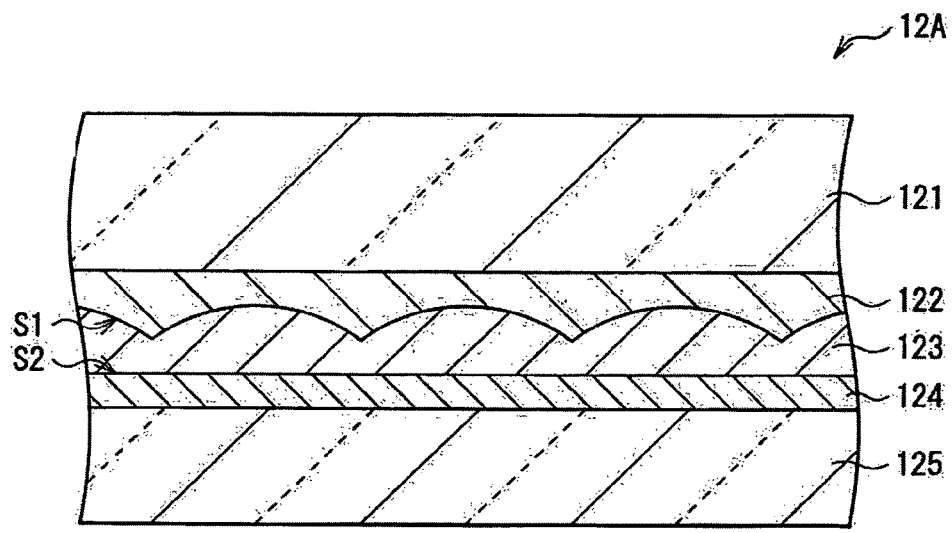
FIG. 16 is an enlarged sectional view of a microlens array illustrated in FIG. 15.

In the above-described embodiment and the like, the case where the focal lengths of the microlens array 12 (the image-side focal length F1 and the object-side focal length F2) are fixed (the case where the refractive power of the microlens array 12 is fixed) is described; however, like a biometrics authentication system 1A illustrated in FIG. 15, a voltage supply section 17 supplying a voltage to a microlens array 12A may be further included, and the refractive power of a microlens (a microlens array 12A) may be changed according to the voltage supplied from the voltage supply section 17. More specifically, in the microlens array 12A, for example, as illustrated in FIG. 16, a liquid crystal layer 123 is formed between a pair of facing substrates 121 and 125, and electrodes 122 and 124 are formed between the liquid crystal layer 123 and the substrate 121 and between the liquid crystal layer 123 and the substrate 125, respectively. The substrates 121 and 125 each are made of, for example, a transparent substrate such as a glass substrate, and an incident light ray is allowed to pass through the substrates 121 and 125. A voltage is supplied to the electrodes 122 and 124 from the voltage supply section 17. The electrodes 122 and 124 each are made of, for example, a transparent electrode of ITO (Indium Tin Oxide), and as in the case of the substrates 121 and 125, an incident light ray is allowed to pass through the electrodes 122 and 124. On a surface S1 of the electrode 122 of surfaces S1 and S2 of the electrodes 122 and 124, a plurality of concave curved surfaces are formed in a matrix form, thereby a plurality of liquid crystal microlenses are formed. The liquid crystal layer 123 is formed of, for example, a liquid crystal material such as nematic liquid crystal, and the refractive index of the liquid crystal layer 123 is changed according to a voltage applied between the electrodes 122 and 124. In the microlens array 12A with such a configuration, when a voltage supplied to the microlenses is low, the refractive index of the liquid crystal layer 123 is reduced accordingly, and as a result, like a light ray L1 in FIG. 17, an incident light ray toward the microlens are refracted in a refraction direction forming a relatively small refraction angle to be condensed at a relatively long focal length (for example, at a focal point position P1 on an optical axis L0 illustrated in FIG. 17). On the other hand, when the voltage supplied to the microlenses is high, the refractive index of the liquid crystal layer 123 is increased accordingly, and as a result, for example, like a light ray L2 in FIG. 17, the incident light ray toward the microlens is refracted in a refraction direction forming a relatively large refraction angle to be condensed at a relatively short focal length (for example, at a focal point position P2 on an optical axis L0 illustrated in FIG. 17). Thus, when the voltage supplied to the microlenses is changed, a different refractive power is generated in the microlenses, and the focal length of the microlens array 12A is changed. Therefore, in the biometrics authentication system 1A including such a microlens array 12A, vein authentication illustrated in FIG. 4 and fingerprint authentication illustrated in FIG. 14 are able to be performed.

Figure 17:
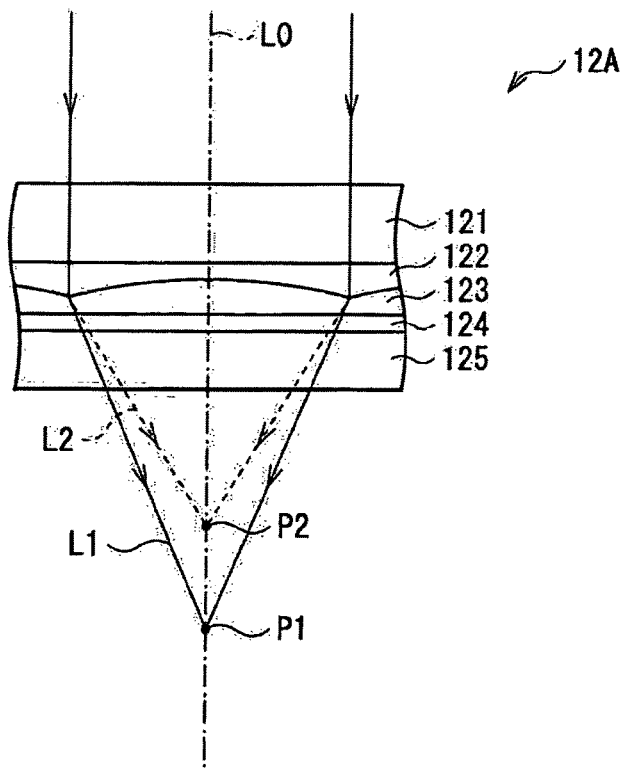
FIG. 17 is a schematic sectional view for describing the function of the microlens array illustrated in FIG. 16.

Depending on the kind of a liquid crystal material of the liquid crystal layer 123, in the case where the vein pattern of the living organism 2 is obtained, when a higher voltage than a predetermined threshold voltage is supplied from the voltage supply section 17 to the microlenses in the microlens array 12A, the refractive index of the liquid crystal layer 123 may be reduced, and the refraction angle of the incident light ray to the microlenses may be reduced, and on the other hand, in the case where the fingerprint pattern of the living organism 2 is obtained, when a lower voltage than the predetermined threshold voltage is supplied from the voltage supply section 17 to the microlenses in the microlens array 12A, the refractive index of the liquid crystal layer 123 may be increased, and the refraction angle of the incident light ray to the microlenses may be increased. In FIGS. 16 and 17, the case where the surface S1 of the surfaces S1 and S2 of the electrodes 122 and 124 has a curved surface is described; however, for example, the surface S2 may also have a curved surface, thereby microlenses having curved surfaces on both sides of the liquid crystal layer 123 may be formed. Moreover, in FIGS. 16 and 17, the case where the microlenses are formed of liquid crystal microlenses is described; however, as long as the microlenses are capable of changing the refraction direction of the incident light ray according to an applied voltage, microlenses with any other configuration may be used, and, for example, liquid microlenses using two liquid layers of different kinds may be used.

In the above-described embodiment and the like, the biometrics authentication system is described as an example of the application using the image pickup apparatus according to the embodiment of the invention; however, for example, the image pickup apparatus according to the embodiment of the invention is applicable to any other application such as image pickup in which close-up image pickup such as image pickup of a two-dimensional code is necessary.

The invention claimed is:

1. An image pickup apparatus comprising:
a microlens array section including a plurality of microlenses;
an image pickup device obtaining image pickup data of an object subjected to image pickup on the basis of light condensed by the microlens array section; and
an image processing section performing image processing on the image pickup data obtained by the image pickup device to obtain image-processed data,
wherein after the image processing section performs a central region clipping process and an image reversing process in each of image pickup regions of the microlenses on the image pickup data, the image processing section performs an image synthesizing process using images in central regions of the image pickup regions to obtain the image-processed data, and
wherein in the case where the object subjected to image pickup is placed in a position at an object-side focal length of the microlens array section, a central region at the time of the central region clipping process is defined by a value determined by multiplying a pitch length between the microlenses by a down-magnification performed by the microlenses.

2. The image pickup apparatus according to claim 1, wherein
after the image processing section performs the central region clipping process in each of the image pickup regions of the microlenses on the image pickup data, the image processing section performs the image reversing process.

3. An image pickup apparatus comprising:
a microlens array section including a plurality of microlenses;
an image pickup device obtaining image pickup data of an object subjected to image pickup on the basis of light condensed by the microlens array section; and
an image processing section performing image processing on the image pickup data obtained by the image pickup device to obtain image-processed data,
wherein the image processing section is configured to perform a central region clipping process in each of image pickup regions of the microlenses on the image pickup data,
wherein
the image processing section determines whether or not ranges of central regions at the time of the central region clipping process is appropriate, and a range of the central regions is changed depending on a result of determination, thereby magnification correction on an image of the object subjected to image pickup is performed,
wherein the image processing section is configured to change the ranges of the central regions depending on a distance between the object subjected to image pickup and the microlens array section, and
wherein in the case where the object subjected to image pickup is placed in a position farther than an object-side focal position of the microlens array section, the image processing section changes the ranges of the central regions to be larger than a defined range defined by a value determined by multiplying a pitch length between the microlenses by a down-magnification by the microlenses and in the case where the object subjected to image pickup is placed in a position closer than the object-side focal position, the image processing section changes the ranges of the central regions to be smaller than the defined range.

4. The image pickup apparatus according to claim 3, wherein
in the case where the resolution in an image obtained after the image synthesizing process is the highest, the ranges of the central regions are determined appropriate.

5. The image pickup apparatus according to claim 3, wherein
the image processing section sets the ranges of the central regions depending on a distance between the object subjected to image pickup and the microlens array section in each of image pickup regions of the microlenses, and the magnification correction is performed in each of the ranges of the central regions.

6. The image pickup apparatus according to claim 1, further comprising:
a voltage supply section supplying a voltage to the microlens array section,
wherein the microlenses are configured so that the refractive power is changed according to a voltage supplied from the voltage supply section.

7. The image pickup apparatus according to claim 6, wherein the microlens array section includes:

a pair of substrates;

a pair of electrodes formed on the substrates, the pair of electrodes to which a voltage is applied from the voltage supply section; and a liquid crystal layer arranged between the pair of electrodes, and at least one of the pair of electrodes has a curved surface for forming the microlenses.

8. The image pickup apparatus according to claim 1, wherein the object subjected to image pickup is a living organism, and the image pickup apparatus includes:

a light source applying light to the living organism, and an authentication section performing the authentication of the living organism on the basis of the image-processed data obtained by the image processing section.

* * * * *